(12) United States Patent
Takahashi

(10) Patent No.: US 6,320,130 B1
(45) Date of Patent: Nov. 20, 2001

(54) CIRCUIT MEMBER AND CIRCUIT BODY ASSEMBLED WITH ADJUSTING PART

(75) Inventor: Toshiharu Takahashi, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/305,276

(22) Filed: May 5, 1999

(30) Foreign Application Priority Data

May 20, 1998 (JP) .................................................. 10-138870

(51) Int. Cl.$^7$ ...................................................... H02G 5/00
(52) U.S. Cl. ........................ 174/68.2; 174/251; 174/72 A; 174/72 B; 439/32
(58) Field of Search ................................ 439/32, 949, 79, 439/935; 174/72 R, 72 A, 72 B, 72 TR, 251, 68.2, 117 AS; 361/775

(56) References Cited

U.S. PATENT DOCUMENTS

| | | | |
|---|---|---|---|
| 4,874,908 | * | 10/1989 | Johansson .......................... 174/72 A |
| 5,229,922 | * | 7/1993 | Muramatsu et al. .................. 361/736 |
| 5,647,749 | * | 7/1997 | Atoh et al. .............................. 439/79 |

* cited by examiner

Primary Examiner—Kamand Cuneo
(74) Attorney, Agent, or Firm—Oblon, Spivak, McClelland, Maier & Neustadt, P.C.

(57) ABSTRACT

A circuit body consisting of two circuit members 11, 12 is provided. In each circuit member, a plurality of bus bars 13 are juxtaposed at regular intervals and carried by resinous holders 14, 15. In producing, the circuit members 11, 12 are mutually overlapped by slide movement of the circuit member 11 on one hand along the circuit member 12 on the other hand. Then, the so-laminated circuit members 11, 12 are fixed to each other by means of resinous molding. The circuit member 11 is provided with an adjusting part 21. When sliding the circuit member 11, the adjusting part 21 comes into prior contact with the circuit member 12, so that respective connecting parts 20 of the bus bars 13 of the circuit member 11 are raised from the circuit member 12.

10 Claims, 6 Drawing Sheets

CIRCUIT MEMBER AND CIRCUIT BODY ASSEMBLED WITH ADJUSTING PART

BACKGROUND OF THE INVENTION

The present invention relates to a circuit body having a plurality of circuit members, which is disposed inside an electrical component, such as a connector. Generally, in an electrical circuit of the electrical component, there is uses at least one circuit body having a plurality of plate-shaped bus bars. In order to produce the circuit body, it is carried out to firstly produce a circuit member as a primary molding body. In the circuit member, a plurality of bus bars are juxtaposed and secured with each other through the intermediary of resinous material for the primary molding. Next, on preparation of a plurality of circuit members obtained as above, they are assembled to form a circuit body in which the circuit members are secured with each other through resinous material charged at the secondary molding.

SUMMARY OF THE INVENTION

FIG. 1 shows a circuit member 1 produced in accordance with our proposal (It is not a prior art). Additionally, FIGS. 2a to 2c designate a process of producing a circuit body by using the circuit member 1.

We now describe the structure of the member 1 and the method of producing the circuit body in brief.

As shown in FIG. 1, the circuit member 1 includes a plurality of bus bars 2 each of which has been bent by plural times in order to form an inside circuit, and a plurality of holders 3 of resin, each of which is appropriately disposed in the longitudinal direction of the bus bars 2, for holding them under their juxtaposed arrangement. Each bus bar 2 has one side portion covered with a cover part 4 made of resin. Successively formed integrally with the tip of the cover part 4 through a resinous bending part 6 is a flat plate 5 which covers the bus bars 2 while also exposing them in a row, partially. The exposed portions of the respective bus bars 2 are subjected to conductive plating, thereby providing the member 1 with connecting parts 7. The so-obtained connecting parts 7 are electrically connected to electrodes on a printed board through bonding wires (not shown in the figure). For this connection, the circuit member 1 is so formed that when combining the member 1 with another circuit member 8 of FIGS. 2A to 2C for producing a circuit body, the connecting parts 7 expose themselves on the surface of the resultant circuit body. Therefore, in FIG. 1, the flat part 5 succeeding the cover part 4 through the bending part 6 is established to be somewhat higher than the cover part 4.

Next, we describe a process of producing the circuit body by overlapping the circuit member 1 and the circuit member 8 with each other, with reference to FIGS. 2A to 2C. Note, the circuit member 8 on the other side, as well as the circuit member 1, is also provided while the juxtaposed bus bars 9 are held by means of a holder 10.

First of all, as shown in FIG. 2A, the circuit member 8 on the other side is disposed in a not-shown molding die. Thereafter, as shown in FIG. 2B, the circuit member 1 on one side is slid along the circuit member 8 while directing the flat part 5 of the member 1 to the circuit member 8. With this slide movement, as shown in FIG. 2C, the circuit member 1 is overlaid on the circuit member 8 and arranged in the molding die. Then, after closing the molding die, the circuit members 1, 8 are integrated in a secondary molding body by ejecting resinous material into the molding die.

However, since the flat part 5 is higher than the covering part 4, the bus bars 2 exposing on the flat part 5 come into contact with the holder 10 of the circuit member 8 when overlaying the circuit member 1 on the circuit member 8. Due to this contact of the bus bars 2 with the holder 10, the exposed portions of the bus bars 2 are worn, so that the conductive plating may peel off the connecting parts 7 while producing scratches. Consequently, a problem arises in that there is no guarantee of reliable wire-bonding between the electrodes etc. and the connecting parts 7. Further, it should be noted that the above-mentioned abrasion is disadvantageous to the circuit body in view that not only the connecting parts 7 of the bus bars 2 but other exposed portions having no conductive plating is damaged due to the wearing with the circuit member 8 and stained with the resinous material of the member 8, thereby causing the circuit body's conductivity in case of contacting the bus bars 2 with external terminals to be deteriorated.

Under such a situation, it is therefore an object of the present invention to provide a circuit body which is capable of preventing the wear of exposed portions of bus bars in case of overlaying one circuit member on another circuit member, whereby it is possible to exclude the abrasion of conductive plating, the occurrence of scratches and which can exclude a possibility of sticking resinous material on the exposed portions of the bus bars.

In the first aspect of the invention, the above-mentioned object of the present invention can be accomplished by a circuit member comprising:

a plurality of bus bars made of conductive material;

at least one holding part for holding the bus bars in their juxtaposed state, the holding part being made of insulating material; and an adjusting part formed integrally with the bus bars and positioned in the vicinity of respective end portions of the bus bars, the adjusting part being made of insulating material and having an adjusting face on a different level with a horizontal plane including the end portions of the bus bars.

With this configuration, the adjusting part is provided with the adjusting face on a different level with a horizontal plane including the end portions of the bus bars. Therefore, during the slide engagement of the circuit member with a different circuit member, the adjusting part serves to prevent the bus bars of the circuit member from the other circuit member.

Preferably, each of the bus bars of the circuit member is an elongated plate which is bent so as to have a substantial U-shaped configuration.

Preferably, the circuit member of the second aspect further comprises a covering part arranged in the vicinity of the adjusting part, for covering the bus bars partially, the covering part being also made of insulating material.

Preferably, the end portions of the bus bars have conductive plating applied thereon.

Preferably, the adjusting face of the adjusting part is raised from the end portions of the bus bars in a step manner Preferably, both holding part and adjusting part are made of insulating esinous material.

According to the second aspect of the invention, there is also provided circuit body comprising:

a first circuit member having a plurality of bus bars made of conductive material and at least one holding part for holding the bus bars in their juxtaposed state, the holding part being made of insulating material;

a second circuit member having a plurality of bus bars made of conductive material and at least one holding part made of insulating material for holding the bus bars in their juxtaposed state, the second circuit member being overlaid with the first circuit member by sliding the first and second circuit members relatively to each other; and molding material for solidifying the so-laminated first and second circuit members;

wherein the first circuit member further includes an adjusting part which is formed integrally with the bus bars and positioned in the vicinity of respective end portions of the bus bars, the adjusting part being made of insulating material and having an adjusting face on a different level with a horizontal plane including the end portions of the bus bars;

whereby, when relatively sliding the first and second circuit members to each other, the adjusting part of the first circuit member comes into contact with the second circuit member while taking priority over any other portions of the first circuit member, so that the bus bars of the first circuit member can be maintained apart from the second circuit member during the relative sliding.

Also in this invention, the adjusting part of the first circuit member is provided with the adjusting face on a different level with a horizontal plane including the end portions of the bus bars. Therefore, during the slide engagement of the first circuit member with the second circuit member, the adjusting part serves to prevent the bus bars of the first circuit member from the second circuit member.

Preferably, in the circuit body of the seventh aspect, the first circuit member is provided, in the vicinity of the adjusting part, with a connecting part having conductive plating applied thereon, whereby the adjusting part of the first circuit member allows the connecting part to be apart from the second circuit member during the relative sliding.

In this case, since the adjusting part is arranged in the vicinity of the connecting part of the bus bars, it is possible to raise the connecting part certainly. Accordingly, the conductive plating applied on the connecting part does not contact with the second circuit member, the connecting capability of the bus bars can be ensured without causing the conductive plating to be torn off or damaged.

Preferably, in the circuit body of the eighth aspect, the adjusting face of the adjusting part is raised from the end portions of the bus bars in a step manner.

In this case, owing to the configuration, the adjusting part comes in prior contact with the second circuit member, so that it is possible to separate the bus bars from the second circuit member during the sliding of the first circuit member. In addition, owing to the simple profile, it is possible to provided the adjusting part with ease.

Preferably, both holding part and adjusting part are made of insulating resinous material.

The above and other features and advantages of this invention will become apparent, and the invention itself will best be understood, from a study of the following description and appended claims, with reference to the attached drawings showing some preferred embodiments of the invention.

BRIEF DESCRIPTION OF THE DRAWINGS

FIG. 4A is a cross sectional view showing a condition that the other circuit body is arranged in a molding die, FIG. 4B is a cross sectional view showing a condition of sliding the circuit member and FIG. 4C is a cross sectional view showing a condition that two circuit members are overlapped on each other;

DESCRIPTION OF THE PREFERRED EMBODIMENT

Figure 1:
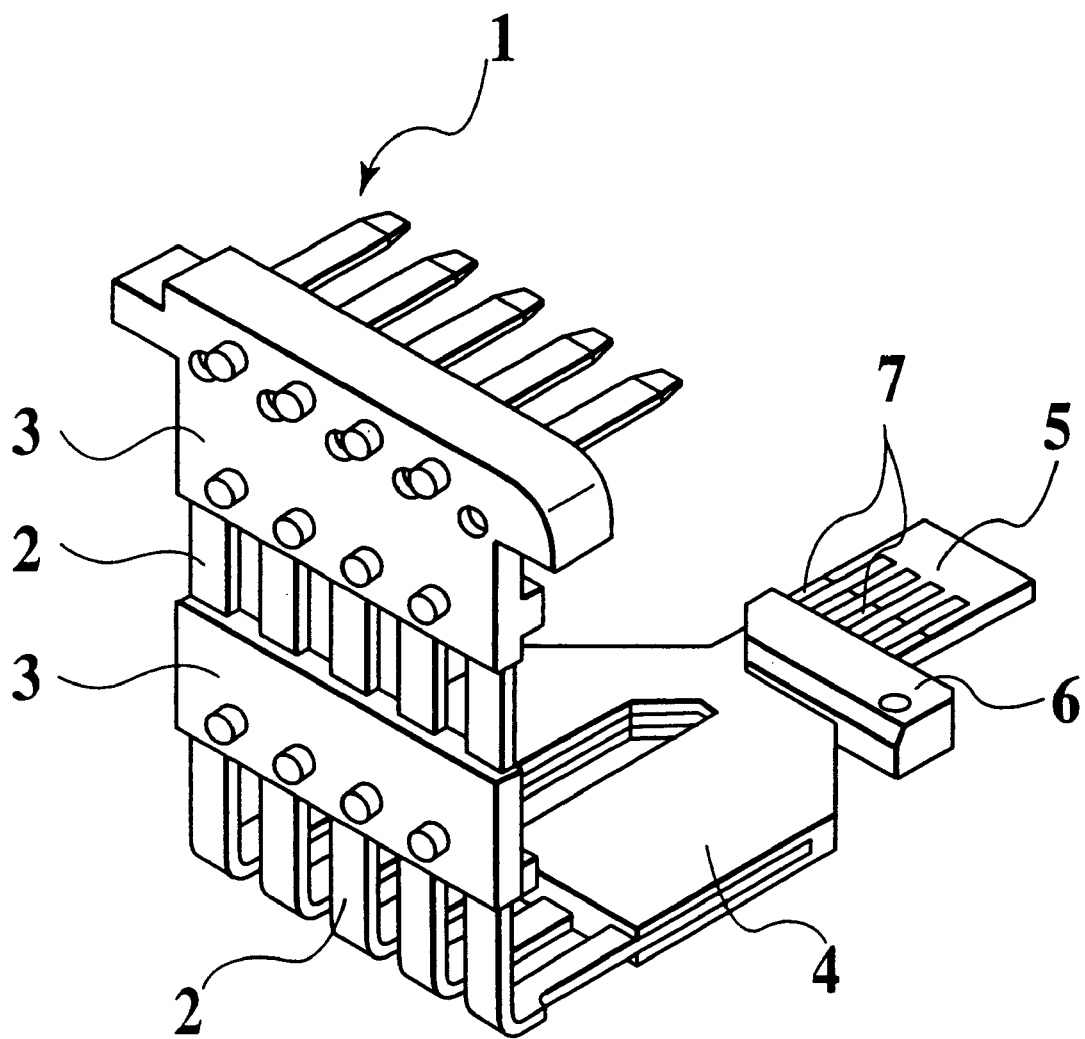
FIG. 1 is a perspective view of a circuit member being used in a circuit body on proposal.
Figure 2:
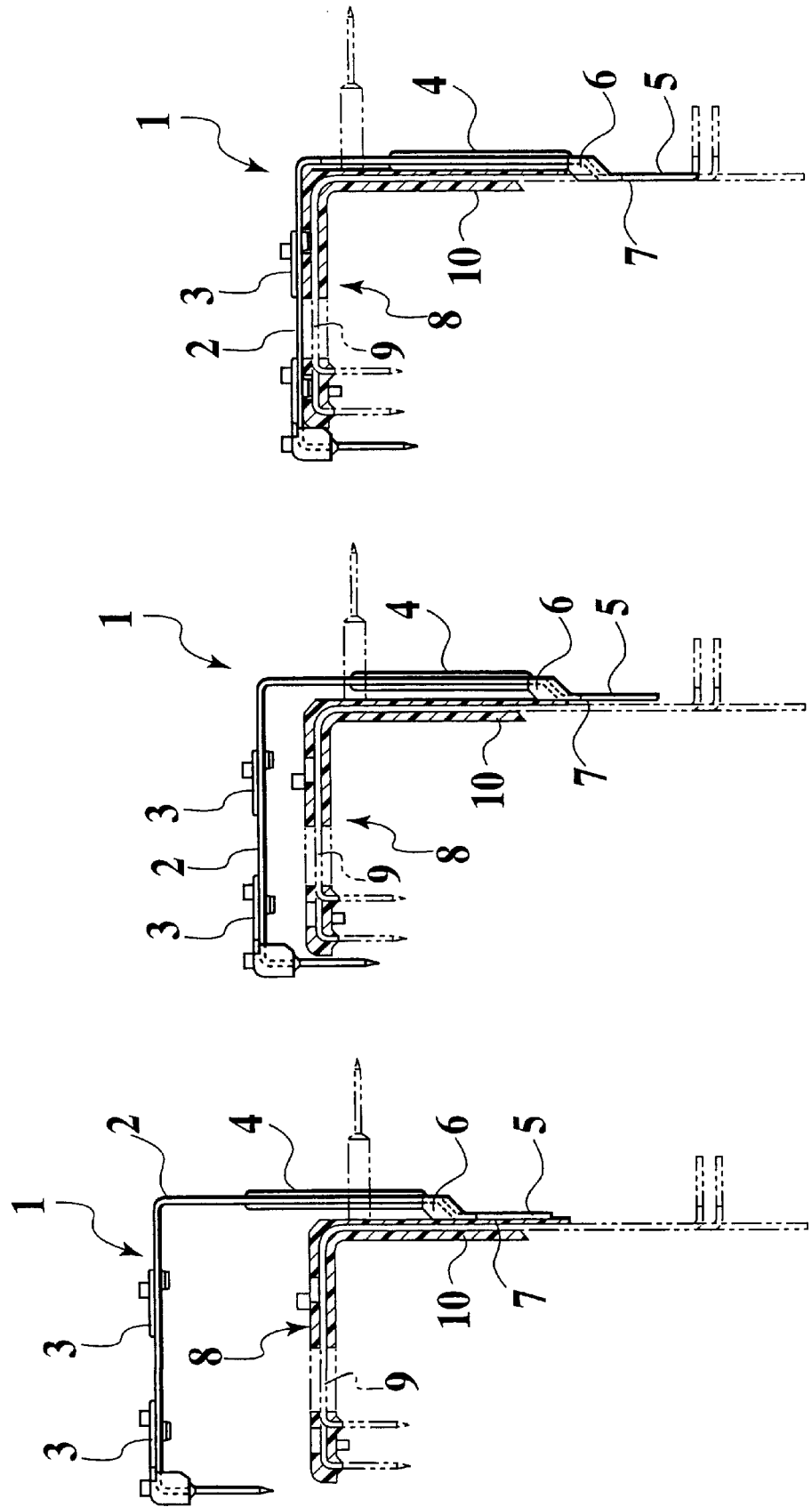
FIGS. 2A to 2C are cross sectional views showing steps of overlapping the circuit member of FIG. 1.
Figure 3:
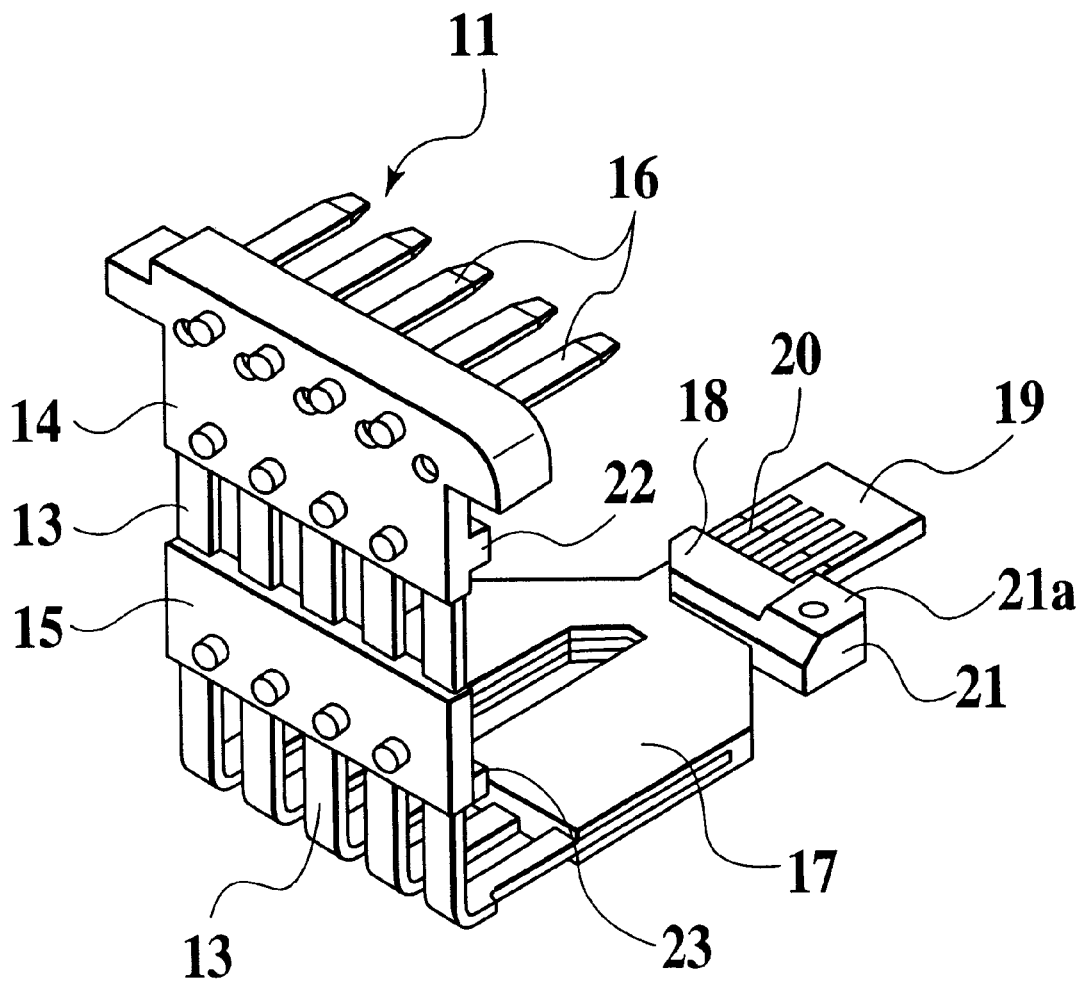
FIG. 3 is a perspective view of one circuit member constituting a circuit body accordance with one embodiment of the present invention.
Figure 4A:
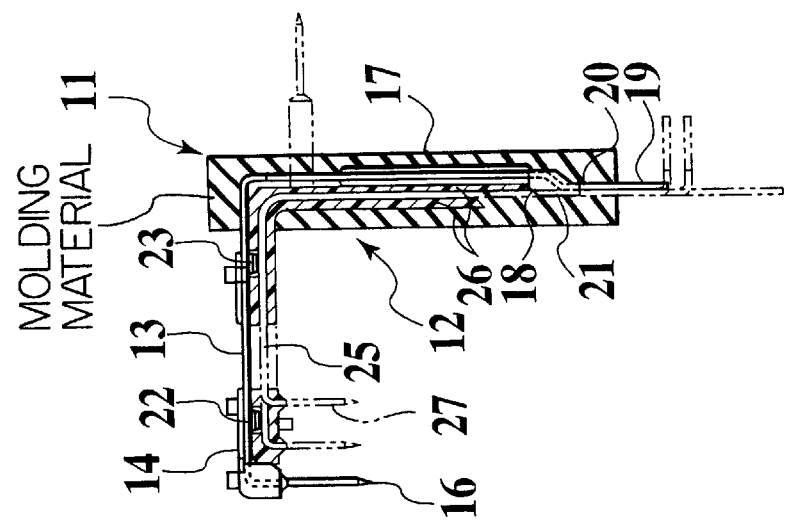
FIGS. 4A to 4C show steps of forming the circuit body.
Figure 4B:
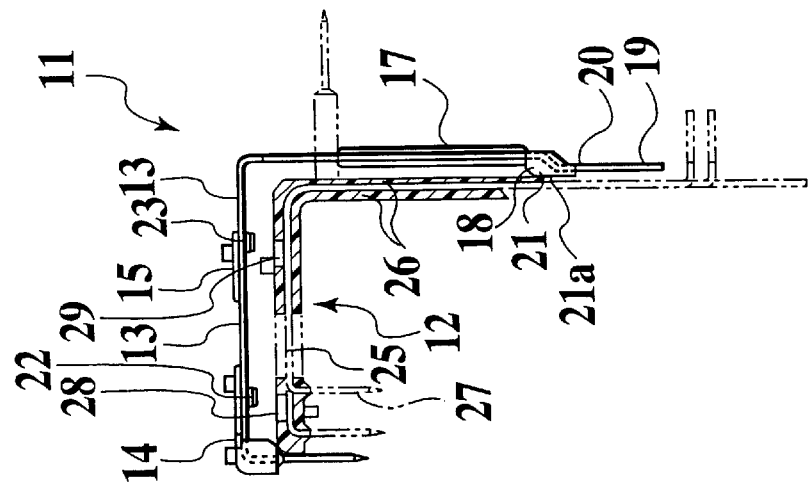
Figure 4C:
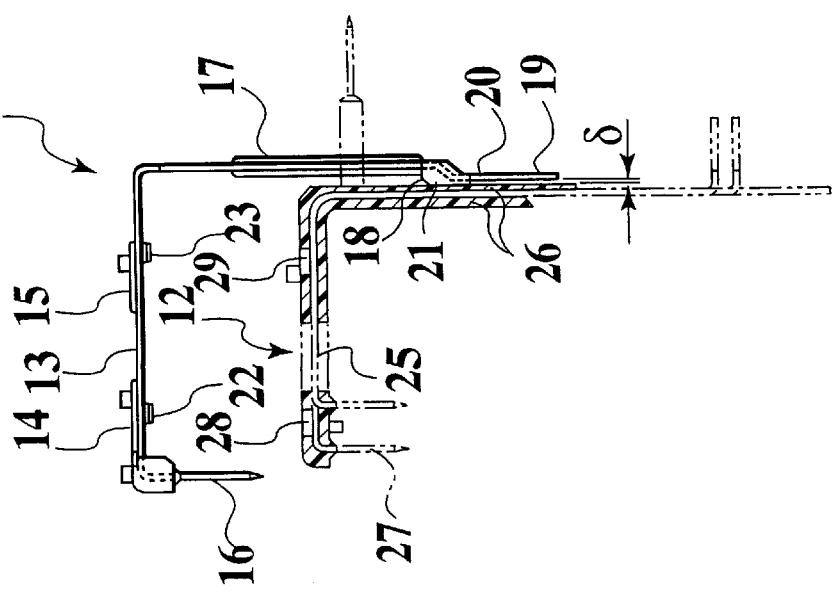

FIG. 3 shows a first circuit member 11 on one side in accordance with the embodiment of the invention, while FIGS. 4A, 4B and 4C show sequent steps of setting the first circuit members 11 and a second circuit member 12 in a molding die.

According to this embodiment of the invention, two circuit members 11, 12 are firstly molded as primary molding bodies. Thereafter, the primary molding bodies are assembled as shown in FIGS. 4A to 4C and subjected to the secondary molding for integration of the assembled bodies through resinous material as a binder.

As shown in FIG. 3, the circuit member 11 includes a plurality of bus bars 13 supported by holders (holding part) 14, 15 made of resin. Each bus bar 12, which is in the form of a substantial U-shaped plate of the embodiment, is bent many times in order to build electrical circuits in the circuit body. Additionally, the plural bus bars 13 are carried so as to be parallel with each other at regular intervals, by the upper and lower holders 14, 15.

Each bus bar 13 is provided, on one side thereof, with a plate-shaped terminal portion 16 which laterally projects from the upper holder 14 to contact with a mating terminal (not shown). The end portion of each bus bar 13, which projects from the lower holder 15 on the opposite side of the terminal portion 16, is bent so as to extend in the same direction as that of the terminal portion 16. The so-extended portions of the respective bus bars 13 are covered with a covering part 17 of resin. Beyond the covering part 17, the respective bus bars 13 are further covered with a bending part 18. Inside the bending part 18, the bus bars 13 are bent upward (in FIG. 3) and subsequently, so-crooked leading portions of the bars 13 are laminated by a flat part 19.

In the flat part 19 of the circuit member 11, the bus bars 13 have partially-exposed portions in a row, which are subjected to conductive plating, such as gold plating. The above plating portions of the bus bars 13 constitute a connecting part 20 to which electrodes of a not-shown printed board or the like are to be connected through bonding wires. When assembling the circuit member 11 to the mating circuit member 12 in order to build the circuit body (not shown), then the connecting part 20 is exposed on the surface of the circuit body and subsequently subjected to wire-bonding.

According to the embodiment, an adjusting part (extension part) 21 made of resinous material is provided in the bending part 18 between the flat part 19 and the covering part 17. On one end of the bending part 18 in the longitudinal direction, the adjusting part 21 is integrally formed to be higher than the bending part 18 in a step manner (FIG. 3). In this way, since the adjusting part 21 becomes higher than the bending part 18 in a step manner, in other words, since the part 21 projects upward in FIG. 3, a top surface of the part 21 constitutes an adjusting face 21a which can come into prior contact with the mating circuit member 12 when assembling the circuit member 11, 12 to each other. In other words, the adjusting part 21 is provided with the adjusting face 21a on a different level with a horizontal plane including the ends of the bus bars 13. Additionally, owing to the positioning of the adjusting part 21 at the bending part 18, the part 21 comes into contact with the circuit member 12 in a position adjacent to the connecting part 20 of the bus bars 13, so that the part 21 can be prevented from contacting with a holder (or holding part) 26 of the mating circuit member.

Note, the upper and lower holders 14, 15 of the circuit member 11 are provided with projections 22, 23 for formal engagement with the mating circuit member 12, respectively. As shown in FIGS. 4A, 4B and 4C, the circuit member 12, as well as the above-mentioned circuit member 11, includes a plurality of bus bars 25 supported by the holder 26 made of resin and juxtaposed with each other. Each bus bar 12 in the form of an elongated plate has one end constituting a plate-shaped terminal 27 for contact with the mating terminal. The holder 26 is provided with a pair of recesses 28, 29 into which the projections 22, 23 of the circuit member 11 are to be fitted.

Next, we describe a method of producing the circuit body on combining the circuit member 11 with the circuit member 12, with reference to FIGS. 4A to 4C. As shown in FIG. 4A, it is firstly carried out to set the circuit member 12 in the molding die (not shown). This setting may be attained by, for example, inserting the plate-shaped terminals 27 into not-shown positioning holes formed on the molding die.

After completing to set the circuit member 12 in the molding die, it is carried out to overlay the circuit member 11 on the mating circuit member 12. Then, as shown in FIG. 4B, it is executed to allow the circuit member 11 to slide along the mating circuit member 12 while maintaining the flat part 19 facing the circuit member 12. With the slide movement, as shown in FIG. 4C, the circuit member 11 on one side is overlaid on the circuit member 12 on the other side. Simultaneously, since the positioning projections 22, 23 are fitted into the recesses 28, 29 respectively, both circuit members 11, 12 can be mutually arranged in respective formal positions. Note, the plate-shaped terminals 16 of the circuit member 11 are also inserted into positioning holes of the molding die, thereby effecting the member positioning with respect to the molding die.

Owing to the arrangement where the adjusting part 21 raised from the flat part 19 projects against the mating circuit member 12 as shown in FIGS. 4A to 4C, when sliding the circuit member 11, then the adjusting face 21a comes into contact with the holder 26, taking a priority over the flat part 19. Therefore, there is produced a clearance δ between the flat part 19 and the holder 26 of the circuit member 12 and also between the connecting part of the bus bars 12 exposing at the flat part 19 and the holder 26. Thus, it is possible to overlay the circuit member 11 on the circuit member 12 without contacting the connecting part 20 of the bus bars 13 with the holder 26 of the circuit member 12. When the circuit members 11, 12 reach respective formal positions, then they are perfectly overlapped on each other since the adjusting part 21 is separated from the holder 26 of the circuit member 12 as shown in FIG. 4C. In this way, the assembled circuit members 11, 12 are disposed in the molding die.

On completion of the above-mentioned overlapping and the nextcoming closing of the molding die, resinous material for the secondary molding is ejected into the molding die. Consequently, two circuit members 1, 8 are united and solidified with each other through the resinous material, thereby providing the circuit body.

Repeatedly, according to the above-mentioned embodiment, since the adjusting part 21 is raised from the flat part 19 in a step manner, the part 21 can contact with the holder 26 of the other circuit member 12, giving priority over the flat part 19, so that the clearance δ is produced between the flat part 19 and the holder 26 of the circuit member 12 and also between the connecting part 20 and the holder 26. Thus, the exposing connecting part 20 of the bus bars 13 does not contact with the holder 26 at all and therefore, there is no possibility that the conductive plating on the connecting part 20 is subjected to abrasion and scratch. Consequently, the exclusion of abrasion and scratch from the conductive plating allows the connecting part 20 to be securely connected with the printed board etc., so that the reliability for electrical connection can be improved furthermore. In addition, owing to the simple configuration, it is possible to form the adjusting part 21 on the circuit member 11 with ease.

Figure 5:
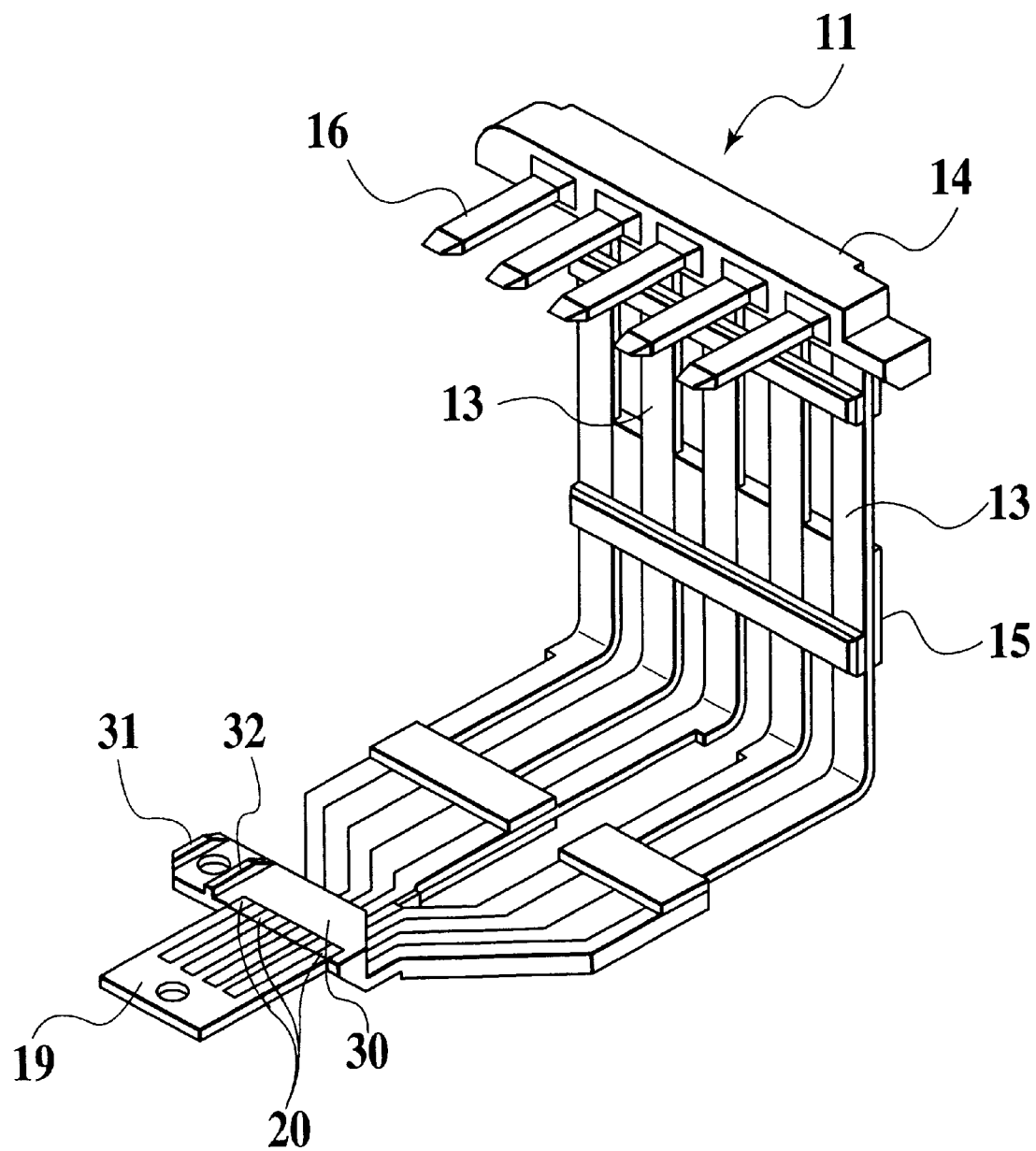
FIG. 5 is a perspective view of the circuit member on one hand, in accordance with a modification of the present invention.
Figure 6:
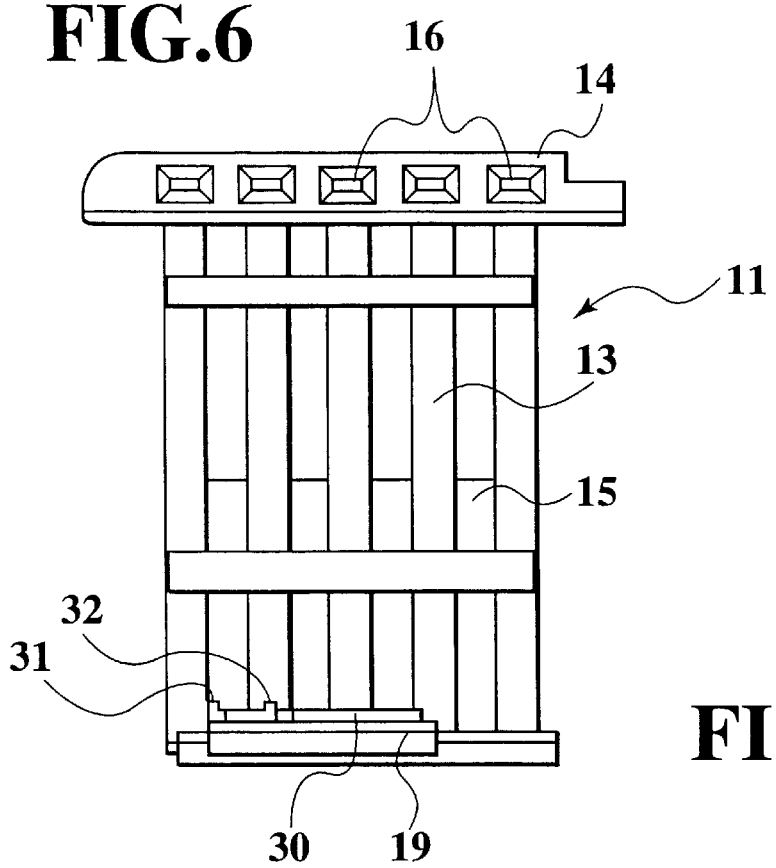
FIG. 6 is a front view of the circuit member of FIG. 5.
Figure 7:
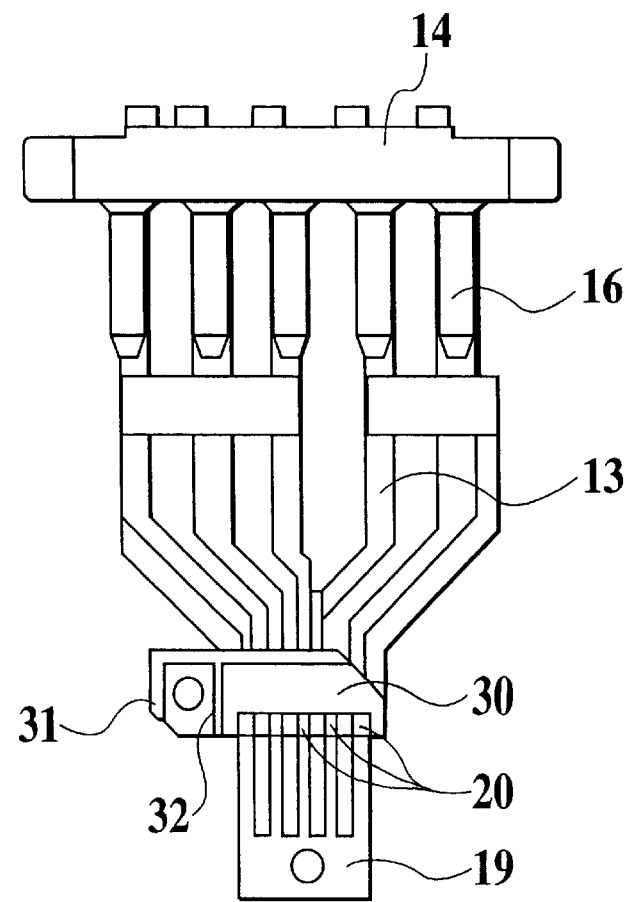
FIG. 7 is a plan view of the circuit member of FIG. 5.

FIGS. 5 to 7 show one modification of the above circuit member 11. Note, in the modification, elements similar to those of the abovementioned embodiment are indicated with the same reference numerals, respectively.

Also in this embodiment, the circuit member 11 is provided with the flat part 19 adjacent to a bending part 30 covering respective raised portion of the bus bars 13. Further, the bus bars 13 expose themselves to the flat part 19, in a row. Similarly to the previous embodiment, the connecting part 20 is also provided by applying the conductive plating on the exposed portions of the bus bars 13.

According to this embodiment, the bending part 30 is laterally elongated so as to form an extended portion. Formed integrally with the extended portion are a pair of ribs 31, 32 which get taller in a step manner, along the sliding direction of the circuit member 11. These ribs 31, 32 do constitute the adjusting part for prior contact with the mating circuit member 12 since they are higher than the connecting part 20. Owing to the provision of the ribs 31, 32, it is possible to prevent the connecting part of the bus bars 13 from contacting with the other circuit member 12 and overlay the circuit member 11 on the circuit member 12 without causing the conductive plating on the connecting part 20 to be torn off or damaged. In addition, since the adjusting part of the embodiment is constituted by the "slender" ribs 31, 32, it is possible to save the consumption of resinous material, whereby a light-weight circuit member can be provided.

In common with the above-mentioned embodiments, although each adjusting part (21, 31, 32) is provided for purposes of preventing the plated connecting part 20 from contacting with the other circuit member 12, the adjusting part may be arranged in other exposed portions of the bus bars 13, for example, the terminal portions 16. In such a case, it is expected that the adjusting part serves to prevent resinous material of the other circuit member from adhering to such exposed portions of the bus bars 13, whereby the conductivity between the exposed portions and external terminals can be ensured.

Finally, it will be understood by those skilled in the art that the foregoing description relates to two preferred embodiments of the circuit body, and that various changes and modifications may be made to the present invention without departing from the spirit and scope thereof.

What is claimed is:

1. A circuit member comprising:

a plurality of bus bars made of conductive material, each bus bar having a terminal end and a connecting end;

at least one holding part for holding the bus bars in their juxtaposed state, the holding part being made of insulating material; and an adjusting part formed integrally with the bus bars and positioned proximate to the connecting ends of the bus bars, the adjusting part being made of insulating material and having an adjusting face on a first plane substantially parallel to and different from a second plane including the connecting ends of the bus bars.

2. A circuit member as claimed in claim 1, wherein each of the bus bars is an elongated plate which is bent so as to have a substantial U-shaped configuration.

3. A circuit member as claimed in claim 2, further comprising a covering part disposed proximate to the adjusting part and covering the bus bars on at least one side, the covering part being made of insulating material.

4. A circuit member as claimed in claim 3, wherein the connecting ends of the bus bars have conductive plating applied thereon.

5. A circuit member as claimed in claim 4, wherein the adjusting face of the adjusting part is raised from the connecting ends of the bus bars in a step manner.

6. A circuit member as claimed in claim 5, wherein said holding part and said adjusting part are made of insulating resinous material.

7. A circuit body comprising:

a first circuit member having a plurality of bus bars made of conductive material, each bus bar having a terminal end and a connecting end, and at least one holding part for holding the bus bars in their juxtaposed state, the holding part being made of insulating material;

a second circuit member having a plurality of bus bars made of conductive material, each bus bar having a terminal end and a connecting end, and at least one holding part made of insulating material for holding the bus bars in their juxtaposed state, the second circuit member being overlaid with the first circuit member by sliding the first and second circuit members relatively to each other; and molding material surrounding and fixedly holding the so-laminated first and second circuit members;

wherein the first circuit member further includes an adjusting part which is formed integrally with the bus bars and positioned proximate to connecting ends of the bus bars, the adjusting part being made of insulating material and having an adjusting face on a first plane substantially parallel to and different from a second plane including the connecting ends of the bus bars;

whereby, when relatively sliding the first and second circuit members to each other, the adjusting part of the first circuit member comes into contact with the second circuit member while taking priority over any other portions of the first circuit member, so that the bus bars of the first circuit member can be maintained apart from the second circuit member during the relative sliding.

8. A circuit body as claimed in claim 7, wherein the first circuit member is provided, in the vicinity of the adjusting part, with a connecting part having conductive plating applied thereon.

9. A circuit body as claimed in claim 7, wherein the adjusting face of the adjusting part is raised from the connecting ends of the bus bars in a step manner.

10. A circuit body as claimed in claim 9, wherein said holding part and said adjusting part are made of insulating resinous material.

* * * * *

UNITED STATES PATENT AND TRADEMARK OFFICE
CERTIFICATE OF CORRECTION

PATENT NO.   : 6,320,130 B1
DATED        : November 20, 2001
INVENTOR(S)  : Toshiharu Takahashi It is certified that error appears in the above-identified patent and that said Letters Patent is hereby corrected as shown below:

Column 3,
Line 49, change "provided" to -- provide --;
Line 64, after "body" insert -- in --.

Column 5,
Line 1, change "21 a" to -- 21a --;
Line 5, change "21 a" to -- 21a --;
Line 45, change "member" to -- member's --;
Line 54, after "part" insert -- 20 --.

Column 6,
Line 42, after "part" insert -- 20 --.

Signed and Sealed this

Third Day of September, 2002

*Attest:*

JAMES E. ROGAN
*Director of the United States Patent and Trademark Office*

*Attesting Officer*